R. A. KIRKPATRICK.
MALT HOUSE.
APPLICATION FILED OCT. 23, 1907.

915,968.  Patented Mar. 23, 1909.
4 SHEETS—SHEET 1.

Witnesses:
E. A. Volk.
A. G. Dimond.

Inventor.
Robert A. Kirkpatrick
By Wilhelm, Parker & Hand.
Attorneys.

R. A. KIRKPATRICK.
MALT HOUSE.
APPLICATION FILED OCT. 23, 1907.

915,968.

Patented Mar. 23, 1909.

4 SHEETS—SHEET 3.

Witnesses:
E. A. Volk
A. G. Dimond

Inventor
Robert A. Kirkpatrick
By Wilhelm, Parker & Hard,
Attorneys.

THE NORRIS PETERS CO., WASHINGTON, D. C.

R. A. KIRKPATRICK.
MALT HOUSE.
APPLICATION FILED OCT. 23, 1907.
915,968.
Patented Mar. 23, 1909.
4 SHEETS—SHEET 4.
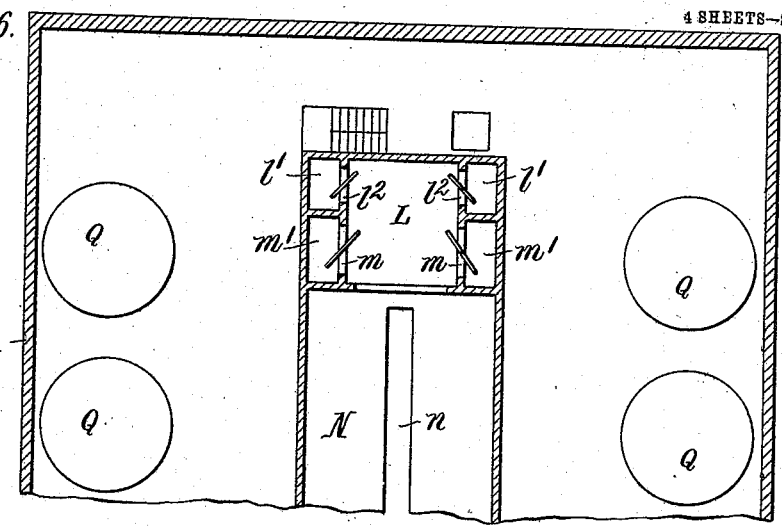
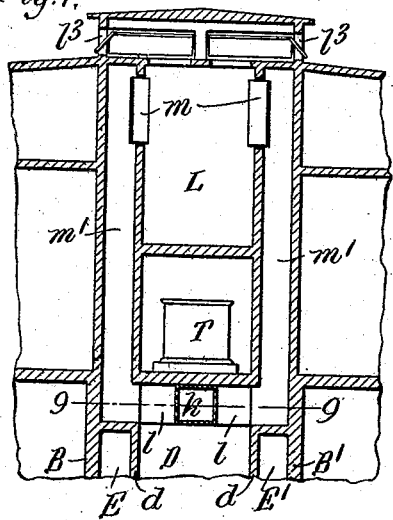 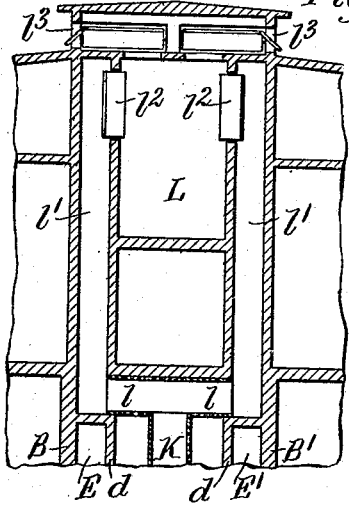
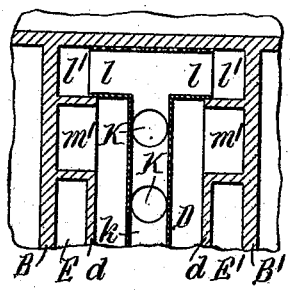
Witnesses:
E. A. Volk.
A. G. Dimond.
Inventor
Robert A. Kirkpatrick
By Wilhelm, Parker & Hood,
Attorneys.

UNITED STATES PATENT OFFICE.

ROBERT A. KIRKPATRICK, OF BUFFALO, NEW YORK.

MALT-HOUSE.

No. 915,968.　　　　Specification of Letters Patent.　　　Patented March 23, 1909.

Application filed October 23, 1907. Serial No. 398,792.

*To all whom it may concern:*

Be it known that I, ROBERT A. KIRKPATRICK, a citizen of the United States, residing at Buffalo, in the county of Erie and State of New York, have invented a new and useful Improvement in Malt-Houses, of which the following is a specification.

This invention relates to the construction of malt houses or buildings for carrying on the manufacture of malt.

The objects of the invention are to so construct the house or building that the processes of germinating or growing the malt and drying it can be successfully accomplished in the same chambers or on the same malting floors and without changing the grain or malt from one floor or chamber to another; also to so arrange the malting and drying chambers and the means for circulating the air therethrough under the different conditions of temperature and moisture required for the different steps in making the malt that such different steps can be carried on simultaneously in different chambers; also to arrange the malting and drying chambers and air flues, together with the air circulating and conditioning means, to the best advantage to increase the capacity of a house of given size and cost; also to arrange the air circulating flues so that the temperature of the moist air for germinating the grain will not be materially affected by the heat from the hot air for drying the malt; and to arrange the air conditioning means so that the varying conditions of temperature and moisture of the air can be regulated to a nicety as required by the different steps of the process or the different conditions prevailing.

Figure 1:
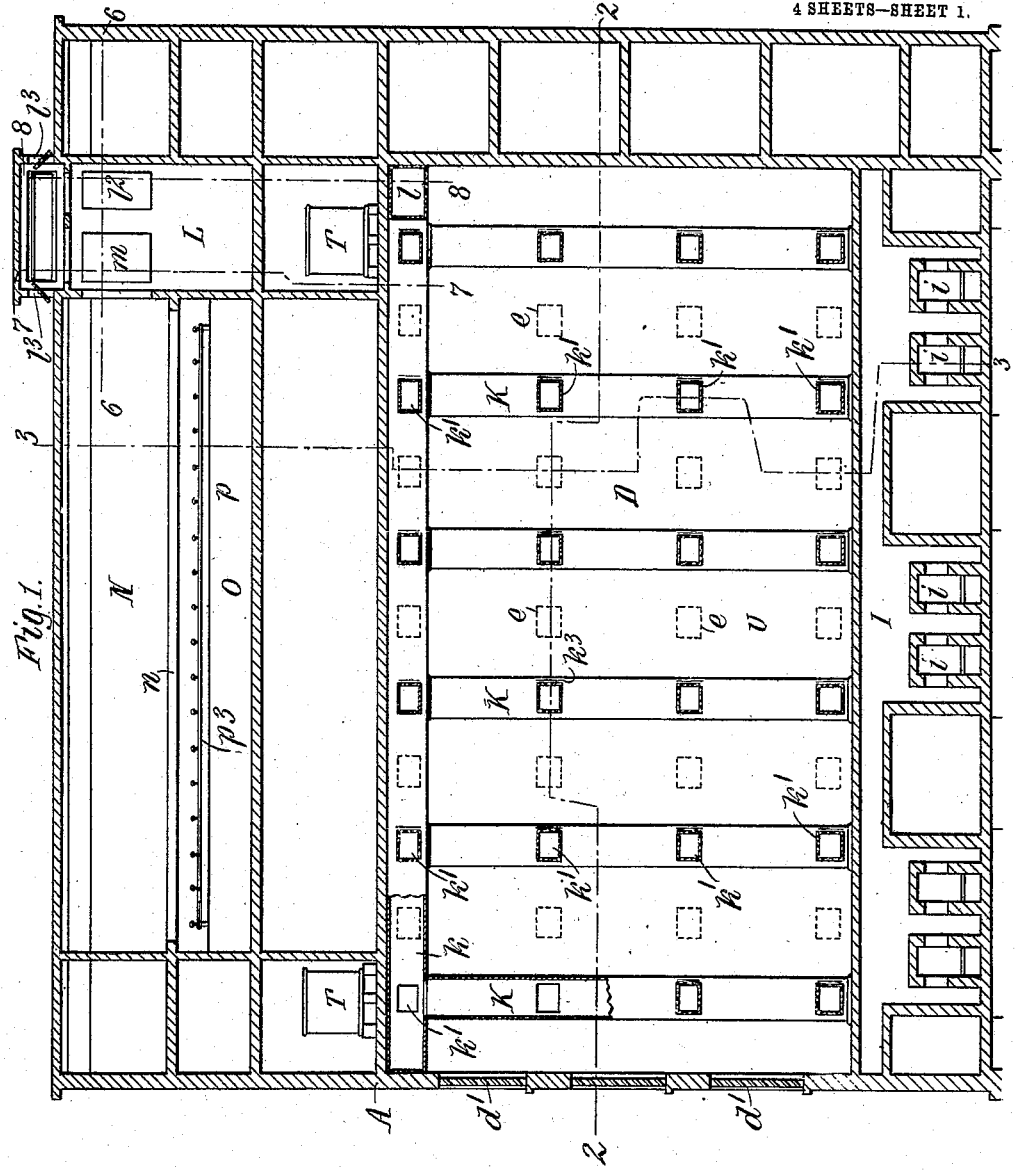
Figure 2:
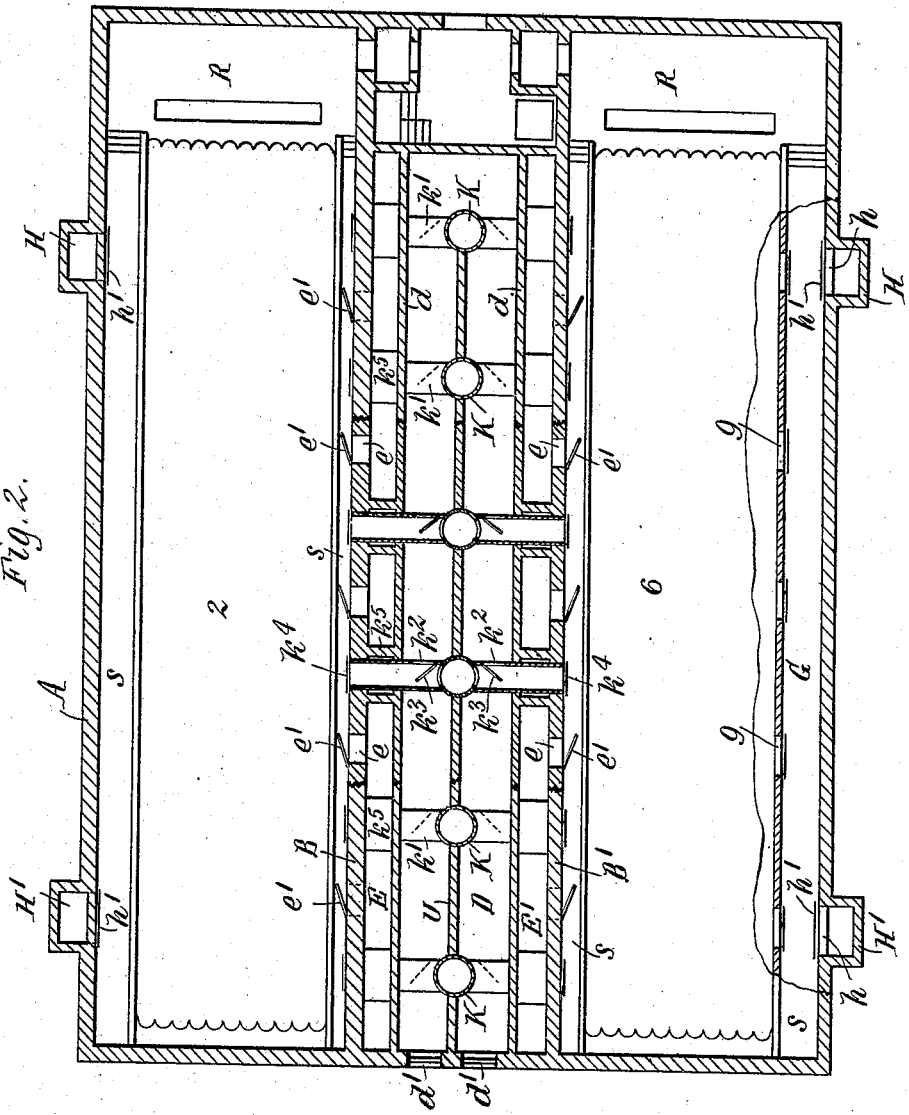
Figure 3:
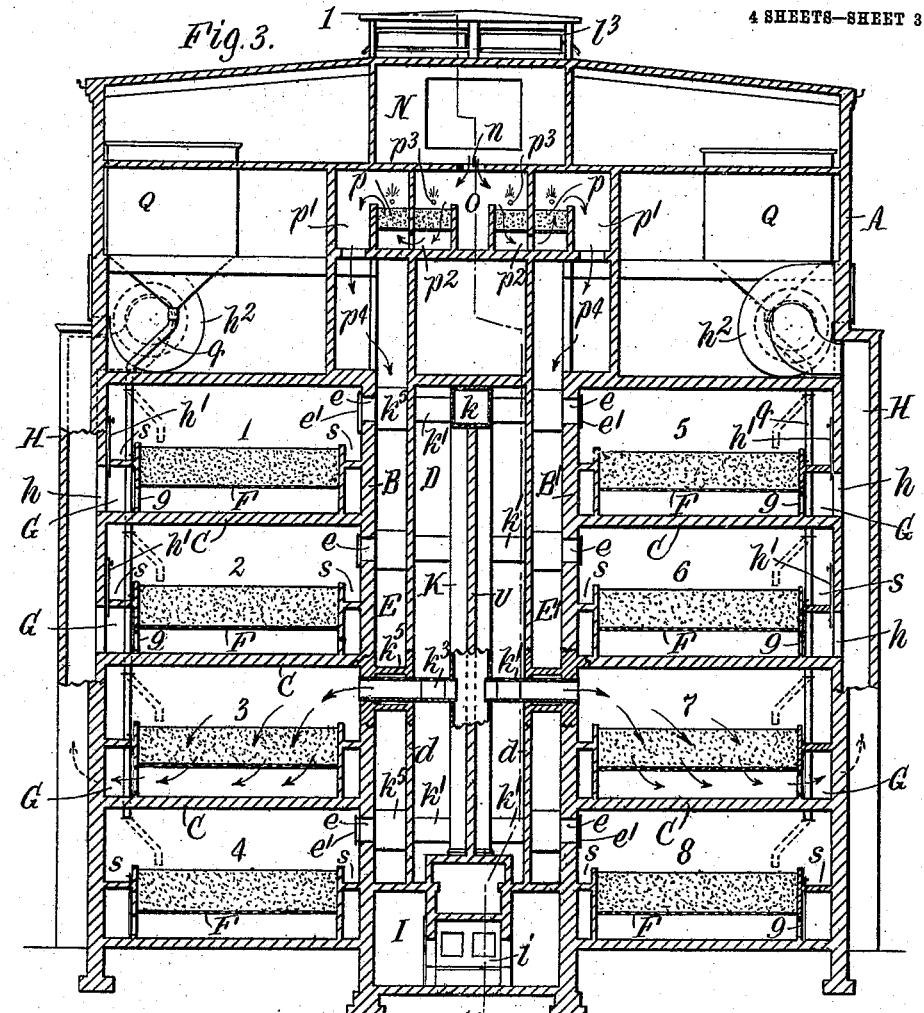
Figure 4:
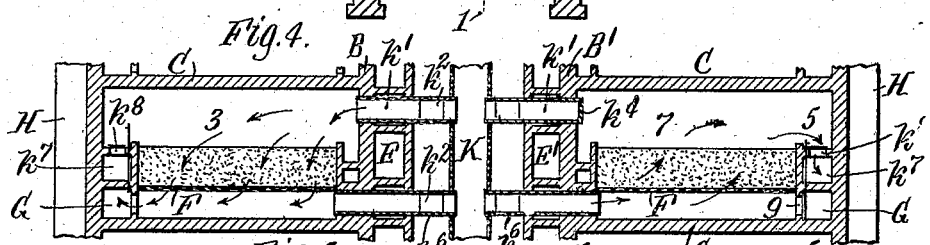
Figure 5:
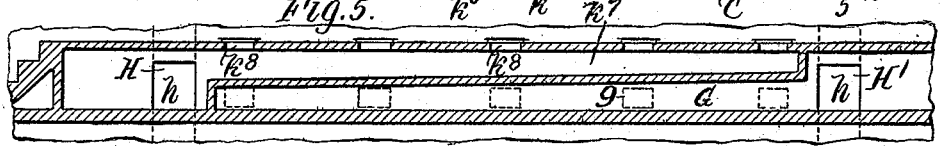

In the accompanying drawings, consisting of four sheets: Figure 1 is a longitudinal sectional elevation, in line 1—1, Fig. 3, of a malt house embodying the invention. Fig. 2 is a sectional plan thereof, in line 2—2, Fig. 1. Fig. 3 is a transverse sectional elevation thereof, in line 3—3, Fig. 1. Fig. 4 is a fragmentary transverse sectional elevation showing a somewhat different arrangement of air flues. Fig. 5 is a fragmentary longitudinal sectional elevation, in line 5—5, Fig. 4. Fig. 6 is a fragmentary sectional plan of the upper portion of the building, in line 6—6, Fig. 1. Figs. 7 and 8 are fragmentary transverse sectional elevations of the mixing chamber and connecting flues, in lines 7—7 and 8—8, respectively, Fig. 1. Fig. 9 is a fragmentary sectional plan of the hot air flues, in line 9—9, Fig. 7.

Like characters of reference refer to like parts in the several figures.

A represents the malt house or building, which, as shown, is of rectangular plan and is several stories high. It is divided into three longitudinal portions by vertical walls B B'. Floors C connecting said division walls B B' with the outer side walls provide several malting and drying chambers or compartments, 1, 2, 3, 4, 5, 6, 7 and 8, in tiers, one over the other, in the side portions of the building. The number of these chambers will depend upon the desired size and capacity of the house. In the house shown, four such chambers are provided at each side. The division walls B B' form a central longitudinal compartment between the two side tiers of malting chambers which extends the full length of the malting chambers and vertically from the lowest to the highest malting chamber, and this compartment is divided by vertical partitions d, Figs. 2 and 3, into a central and two side upright longitudinal air chambers D, E, E', respectively. The central air chamber D is provided at one end with openings d' controlled by suitable shutters or dampers for the intake of outside air, and the side chambers E E' are for delivering moist air to the malting chambers, for which purpose each moist air chamber communicates with each of the several malting chambers at the same side of the building by a number of ports or openings e, Figs. 2 and 3, in the division walls B B' controlled by suitable valves or dampers e'.

F represents perforated malting and drying floors located in the malting chambers 1—8 above the floors C of the latter. The floors F constitute in effect the bottoms of shallow receptacles which extend practically from end to end of the malting chambers. Horizontal air exhaust flues G, Figs. 2 and 3, extend lengthwise along the outer sides of the malting chambers and each communicates with the space beneath the adjacent malting and drying floor by several valve-controlled ports g. The exhaust flues G for the several malting chambers at each side of the building connect at opposite ends by ports h, Fig. 2, controlled by valves or dampers h' with upright exhaust stacks or trunks H H' located near the ends of the building and leading to suitable fans or exhausters $h^2$, Fig. 3, located in the upper portion of the building.

I represents a furnace room extending lengthwise beneath the air intake chamber D, and $i$ are suitable furnaces therein for drying the malt. Upright hot air pipes K extend up from the furnaces through the air intake chamber and connect at their upper ends with a horizontal trunk flue $k$ extending lengthwise of the upper portion of the air intake chamber. Each main hot air pipe K connects by lateral branch pipes $k'$ with the several malting chambers to deliver thereinto the hot air and gases from the furnaces. The branch pipes preferably have cold air inlet openings $k^2$ in their sides controlled by internal hinged dampers $k^3$ in the branch pipes, see Fig. 2. By opening or closing these dampers more or less, the hot air or gases from the main pipes and cold air from the intake chamber D can be mixed in any desired proportion to give a required temperature of the hot air or gases entering the malting chambers. Dampers $k^4$ at the outer ends of the branch hot air pipes enable the quantity of air discharged by the pipes into the malting chambers to be controlled or shut off at will. The branch hot air pipes $k'$ pass through the moist air distributing chambers E E' and are preferably surrounded in these chambers by insulating sleeves $k^5$ to prevent heating the moist air in these chambers. In Figs. 1–3, the branch hot air pipes enter the malting chambers above the malt floors or receptacles so that the hot air will be drawn downwardly through the malt into the exhaust flues G, as indicated by the arrows in Fig. 3.

Figs. 4 and 5 show a construction in which additional branch hot air pipes $k^6$ enter the malting chamber beneath the malting floors or receptacles, and an additional exhaust flue $k^7$ is provided at the outer side of each malting chamber over the exhaust flue G and communicating with the malting chamber above the malt receptacle by valved ports $k^8$. The flue G connects with one exhaust stack H' and the flue $k^7$ with the other exhaust stack H. With this construction the hot air can be circulated downwardly through the malt, as before, by closing the branch hot air pipes $k^6$ and the ports of the exhaust flue $k^7$, or, if preferred, the branch pipes $k'$ and inlets to the exhaust flue G can be closed and the other branch hot air pipes $k^6$ and exhaust flue $k^7$ used, when the hot air will be circulated upwardly through the malt. The first arrangement is shown at the left-hand side of Fig. 4, and the latter arrangement at the right-hand side of the same figure. The horizontal hot air trunk $k$ is connected, for instance, by lateral branches $l$, Figs. 1 and 9, at one end thereof, and ascending flues $l'$, Figs. 8 and 9, with an air mixing or attemperating chamber L, Figs. 1 and 6, in the top of the building preferably at the central portion of one end thereof. The discharge openings of the ascending flues $l'$ connect with the mixing chamber by valve-controlled openings $l^2$, see Fig. 8. Outside air is admitted to the mixing chamber through suitable openings $l^3$ in the roof thereof provided with suitable doors or shutters, and air from the air admission chamber D can also enter the mixing chamber through valve-controlled openings $m$, Fig. 7, from suitable flues $m'$, Figs. 6, 7 and 9, ascending from the air admission chamber. Thus by a proper adjustment of the valves for the flues $l'$ $m'$ and openings $l^3$, it is possible to admit alone either outside air, hot air, or gases from the furnaces or air from the air admission chamber D which has been tempered by radiation from the hot air pipes, or to mix any or all of these in the proportions necessary to give a required temperature of the air in the mixing room. The mixing chamber L communicates with an air distributing chamber N which extends lengthwise centrally of the upper part of the building and communicates by openings $n$ in its floor with an air moistening room O, Figs. 1 and 3, located beneath it in which the air is moistened to render it fit for carrying on the germinating process. The means shown for moistening the air comprise beds of charcoal or coke in troughs or receptacles $p$ located in the room O and in rooms $p'$ at opposite sides thereof and communicating therewith by passages $p^2$, see Fig. 3. The charcoal or coke is kept wet by water from suitable supply pipes $p^3$, and the troughs have perforated bottoms which allow the passage of air through the charcoal. As indicated by the arrows in Fig. 3, the air passes down through the charcoal in the troughs in the room O and up through the charcoal in the other troughs in the side rooms $p'$ from whence it descends through openings in the floors of the latter rooms and through suitable longitudinal chambers $p^4$ into the moist air distributing chambers E E'.

Q, Figs. 3 and 6, represents steeping vats in which the grain is steeped or soaked preparatory to malting. These vats are located in suitable rooms or compartments in the upper part of the building, and chutes $q$ descend therefrom for conveying the grain to the malting floors or receptacles. These chutes can be made with jointed sections constructed so that grain can be discharged from either vat into any desired malting receptacle, or the grain can be delivered to the malting receptacle in any other usual or suitable way.

In the construction shown in the drawings, rooms or compartments R are provided in the building at one end of each tier of malting chambers in which chutes or other means can be located for handling the grain and malt, and galleries $s$ are provided along the sides of the malting floors or receptacles through which attendants can pass to observe the progress of the malting and drying operations and adjust the dampers of the various flues as may be required to give best results. T, Fig. 1, represents tanks for the water used for moistening the air.

A vertical partition U preferably extends lengthwise centrally in the air intake chamber D from the end provided with the inlet openings $d'$ nearly to the other end of the chamber. The inlet openings are on opposite sides of this partition. By opening the inlet openings on one side only of the partition the air will have to pass to the other end of the chamber before it can enter the malting chambers on the other side of the partition. It is thus possible to heat the air in the intake chamber more or less before entering a malting chamber, by opening the inlet openings on one or the other side of the partition. The air in the intake chamber serves to insulate the moist air chambers E E' from the hot air pipes K so that the moist air is not appreciably heated by radiation from the hot air pipes.

The malt house is operated as follows: As is well understood, to grow or germinate the grain it must be subjected to moistened air at a temperature not exceeding say 70° F. To supply such air to any one or more of the malting chambers, for example, the chamber 2, the dampers $k^4$ of the branch hot air pipes $k'$ entering such chamber are closed and the moist air inlets $e$ are opened, and the ports $g$ to the exhaust flue G are also opened. Air from the mixing chamber L will then be drawn by the suction of the exhausters $h^2$ through the distributing chamber N, moistening rooms O, $p'$, where it is moistened to the required degree, and thence through the chambers $p^4$ and moist air chamber E into the malting chamber and through the malt to the exhaust flue G. When the external atmospheric conditions are proper, outside air alone can be taken from the mixing room L. When the outside temperature is too low, air at the required temperature can be obtained in the mixing room by mixing the air admitted from the various sources thereto, as before explained. The air is cooled in the moisteners when necessary, and the necessary humidity of the air is effected by the proper regulation of the moisteners. When the germinating is finished the moist air inlets $e$ are closed and the dampers $k^4$ of the branch hot air pipes opened. Then by a proper adjustment of the dampers $k^3$ dry air can be admitted either from the dry air chamber D or from the hot air pipes K, or a mixture of both, depending upon the temperature required. The dry air passes through the malt and out through the exhaust flue G the same as the moist air. The temperature of the air can be regulated as the drying proceeds, by suitably adjusting the dampers $k^3$. The hot air can be passed either downwardly or upwardly through the mass of malt by the construction shown in Figs. 4 and 5, and manifestly the same could be done with the moist air by providing additional inlets which, like the hot air pipes $k^6$, would enter the malting chambers beneath the malting floors. The dampers for moist and hot air inlets and exhaust outlets $g$ at different parts of the malting chamber can of course be adjusted to secure a uniform treatment of the malt in different parts of the chamber.

By the described construction of the malting and drying chambers and the air chambers and flues, it is possible to carry on either the malting or the drying operation in all of the malting chambers simultaneously, or the two operations can be in progress in different malting chambers at the same time and the atmospheric conditions can be regulated in each chamber independently of the others as required for the particular stage of the process in that chamber. Both the malting and drying of the same grain is, however, accomplished in the same malting chamber, and the malt does not have to be moved to another chamber for drying. It is thus possible to commence the malting process on grain in one malting chamber one day and on other grain each succeeding day, or other suitable period of time, in another malting chamber without in any wise affecting the operation in any other chamber, so that the malting can be commenced in one chamber and the drying completed in another chamber each day, notwithstanding that several days are required for growing or germinating each individual mass of grain. Where malting is taking place in one or more chambers and drying in another chamber or chambers on the same side of the building, all the exhaust flues G for the malting chamber are connected with one exhaust stack, for instance, H, and all the exhaust flues for the drying chambers are connected to the other stack H' by the proper adjustment of the dampers $h$, so that there will be no danger of the air from a drying chamber entering a malting chamber, or vice versa.

Decided advantages result from making the malting and drying chambers of greater length than width and arranging the air supply flues or chambers between the long sides thereof. Ample furnace space is afforded below the air supply chambers and the hot air flues can ascend vertically from the furnaces and connect with the malting and drying chambers at several points lengthwise thereof so that the air can be uniformly distributed throughout the malting and drying chambers. If hot air were admitted at the ends or short sides of the chambers in sufficient volume to dry the entire masses of malt therein, the malt nearest to the entering air would be scorched or hardened before that at the far ends of the chambers could be dried. It would also be impractical to supply the necessary volume of hot air at the ends of the chambers as considerable ground space would be required at the end of the building for the furnace room, and the flues or chambers for hot, cold and moist air would be in such close proximity as to preclude the proper individual regulation of the temperatures thereof. The moist and cold or tempered air, like the hot air, can also be much more uniformly distributed throughout the masses of grain or malt by the described arrangement, and the malt will therefore be of more uniform quality. The grain and malt can be handled more expeditiously and with less labor in the large chambers than in smaller chambers.

I claim as my invention:

1. In a malt house, the combination of a malting and drying chamber, an air intake chamber having one or more inlets for external air, a moist air distributing chamber arranged between said air intake chamber and said malting and drying chamber and connecting with the latter by one or more valve-controlled passages, one or more hot air pipes in said intake chamber having valve-controlled connection with said malting and drying chamber, means for supplying moist air to said moist air chamber and regulating the temperature, thereof, and means for exhausting air from said malting and drying chamber, substantially as set forth.

2. In a malt house, the combination of a malting and drying chamber, an air intake chamber having one or more inlets for external air, a moist air distributing chamber arranged between said air intake chamber and said malting and drying chamber and connecting with the latter by one or more valve-controlled passages, one or more hot air pipes in said intake chamber having valve-controlled connection with said malting and drying chamber, means for supplying moist air to said moist air chamber and regulating the temperature thereof, means for admitting air to said malting and drying chamber from said air intake chamber, and means for exhausting air from said malting and drying chamber, substantially as set forth.

3. In a malt house, the combination of a malting and drying chamber, an air intake chamber having one or more inlets for external air, a moist air distributing chamber arranged between said air intake chamber and said malting and drying chamber and connecting with the latter by one or more valve-controlled passages, one or more hot air pipes in said intake chamber having valve-controlled connection with said malting and drying chamber, means for supplying external air and air from said intake chamber and said hot air pipe in any desired proportion to said moist air chamber, means for moistening the air so supplied to said moist air chamber, and means for exhausting air from said malting and drying chamber, substantially as set forth.

4. In a malt house, the combination of a malting and drying chamber, an air intake chamber having one or more inlets for external air, a moist air distributing chamber arranged between said air intake chamber and said malting and drying chamber and connecting with the latter by one or more valve-controlled passages, one or more hot air pipes in said intake chamber having valve-controlled connection with said malting and drying chamber, an air mixing chamber, means for admitting external air and air from said intake chamber and hot air pipe to said mixing chamber, means for supplying air from said mixing chamber to said moist air chamber, means for moistening said air, and means for exhausting air from said malting and drying chamber, substantially as set forth.

5. In a malt house, the combination of a malting and drying chamber, a hot air pipe having connection therewith, a moist air distributing chamber arranged between said hot air pipe and said malting and drying chamber and having connection with said malting and drying chamber, an air chamber insulating said hot air pipe from said moist air chamber, means for supplying moist air to said moist air chamber and hot air to said hot air pipe, and means for exhausting air from said malting and drying chamber, substantially as set forth.

6. In a malt house, the combination of malting and drying chambers, an air intake chamber located between said malting and drying chambers and having one or more air inlets, moist air chambers located between said intake chamber and said malting and drying chambers and connecting with the latter by one or more valve-controlled passages, one or more hot air pipes in said intake chamber having valve-controlled connection with said malting and drying chambers, means for supplying moist air to said moist air chambers and regulating the temperature thereof, and means for exhausting air from said malting and drying chambers, substantially as set forth.

7. In a malt house, the combination of malting and drying chambers, an air intake chamber located between said malting and drying chambers and having valve-controlled air inlets at one end thereof, a partition extending from between said inlets longitudinally of said intake chamber, a moist air chamber located between said intake chamber and each malting and drying chamber and connecting with the latter, means for supplying moist air to said moist air chambers, a series of hot air pipes in said intake chamber having connection with said malting and drying chambers, means for admitting air from said intake chamber into said malting and drying chambers, and means for exhausting air from said malting and drying chambers, substantially as set forth.

8. In a malt house, the combination of malting and drying chambers arranged one above the other, a vertical air intake chamber having one or more inlets for external air, a moist air distributing chamber arranged between said air intake chamber and said malting and drying chambers and connecting with the latter chambers by one or more valve-controlled passages, one or more hot air pipes ascending through said air intake chamber and having valve-controlled connection with said malting and drying chambers, means for supplying moist air to said moist air chamber and regulating the temperature thereof, and means for exhausting air from said malting and drying chambers, substantially as set forth.

9. In a malt house, the combination of malting and drying chambers arranged one above the other, means for supplying moist air and dry air into the several chambers at one side thereof, means for regulating the temperature and volume of the air admitted to said chambers, an exhaust flue extending lengthwise at the opposite side of each of said chambers and connecting therewith, two exhaust stacks each connecting with all of said exhaust flues, and valves controlling the connections between said stacks and flues, whereby one exhaust stack can be connected with the exhaust flues for any of said chambers and the other stack connected with the flues for the remaining chambers and the exhaust air from the two groups of chambers kept separate, substantially as set forth.

10. In a malt house, the combination of a malting and drying chamber which is of greater length than width, a moist air distributing chamber arranged adjacent to one side of said malting and drying chamber and communicating therewith at a plurality of points along said side, one or more hot air pipes communicating with said chamber at a plurality of points along said side, and means for exhausting air from said chamber at a plurality of points along the opposite side thereof, substantially as set forth.

11. In a malt house, the combination of malting and drying chambers which are of greater length than width and are arranged substantially parallel lengthwise, moist air distributing chambers arranged between said chambers adjacent to the long sides thereof and communicating therewith at a plurality of points along said sides, one or more hot air pipes arranged between said chambers and communicating therewith at a plurality of points along said sides, and means for exhausting air from said chambers at a plurality of points along the opposite long sides thereof, substantially as set forth.

12. In a malt house, the combination of malting and drying chambers which are of greater length than width and are arranged substantially parallel lengthwise, an air intake chamber extending lengthwise between the long sides of said malting and drying chambers, moist air distributing chambers arranged between said air intake chamber and said malting and drying chambers and communicating with the latter at a plurality of points along the long sides thereof, one or more hot air pipes arranged in said air intake chamber and communicating with said malting and drying chambers at a plurality of points along said long sides thereof, and means for exhausting air from said malting and drying chambers at a plurality of points along the opposite long sides thereof, substantially as set forth.

Witness my hand, this 21st day of October, 1907.

ROBERT A. KIRKPATRICK.

Witnesses:
C. B. HORNBECK,
E. C. HURD.